Patented Sept. 18, 1945

2,384,885

UNITED STATES PATENT OFFICE 2,384,885

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941, Serial No. 403,018

3 Claims. (Cl. 260—19)

This invention relates to thermoplastic compositions comprising polymeric vinylidene chloride products modified with phenol-aldehyde resins, and particularly to compositions containing the modified phenol-aldehyde resins.

As herein used, the term "polymeric vinylidene chloride product" includes the polymer of vinylidene chloride alone and other products, whether polymers, copolymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono- and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made are described in U. S. Patents 2,160,904, 2,206,022, 2,215,379, and 2,160,931 to 2,160,948 inclusive.

Phenolic resins are broadly the products obtained by the reaction, in the presence of a catalyst, or almost any phenolic body such as phenol, cresol, resorcinol, naphthol, etc., with almost any carbonyl compound such as formaldehyde, acetone, benzaldehyde, furfural or their reaction products with ammonia. More specifically, phenol-aldehyde resins include the complexes resulting from the condensation of a phenol with an aldehyde, such as for example, the product obtained by condensing phenol with formaldehyde. The products obtained vary with the kind and relative proportions of the reactants, the nature of the catalyst, and the time and temperature of the reaction. They may be classed as thermosetting and thermoplastic resins. The chief points of difference are the solubility in organic solvents, compatibility with other resins and mechanical strength. The only phenolaldehyde resins here concerned are those which have been modified in the course of their preparation with natural gums or resins, drying or non-drying oils or their corresponding acids, or by the addition of other synthetic resins.

According to the present invention modified phenol-aldehyde resins are incorporated with a polymeric vinylidene chloride product to produce a mass which can be molded or extruded to form articles having a waxy "handle" and a high gloss. For example, a modified phenol-aldehyde resin may be incorporated with a polymeric vinylidene chloride product to produce a mass that can be molded or extruded at lower temperatures and pressures than can the polymeric vinylidene chloride product alone, and articles prepared from such compositions retain a high tensile strength. In many instances addition of the modified phenol-aldehyde resins has a plasticizing effect, particularly at elevated temperatures, and produces a mass that can easily be molded or extruded to form useful articles having a tough, durable, glossy finish and which retain a resistance to chemicals typical of polymeric vinylidene chloride products. Furthermore, addition of a modified phenol-aldehyde resin to a polymeric vinylidene chloride product produces a mass that can easily be extruded to form threads, bands, filaments, foils, and the like which are more flexible, have a waxy handle, a glossy finish, and which retain the high tensile strength shown by similar articles prepared from the polymeric vinylidene chloride product alone.

The addition of the modified phenol-aldehyde resins to the polymeric vinylidene chloride product may be effected by any of several methods. For example, the polymeric vinylidene chloride product and the particular modified phenol-aldehyde resin to be employed may be mixed or ground together in a ball mill or other suitable mixer commonly employed in the plastic art, or they may be added to the polymer on hot rolls in a method similar to compounding rubber compositions. Another satisfactory method of incorporating the modified phenol-aldehyde resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

*Example 1*

2.5 grams of Arochem 510, a modified phenol-aldehyde resin having a melting point of 100 to 105° C. and 5.0 grams of 1,2-epoxy-3(2-phenyl phenoxy) propane, to serve as a heat stabilizer, were incorporated in 20 ml. of acetone. To this solution was added 42.5 grams of a co-polymer consisting of 90 per cent vinylidene chloride and 10 per cent vinyl chloride. The mixture was ground until thoroughly blended, and then dried.

The composition could easily be molded or extruded and filaments, having a diameter of 0.0125 inch, prepared from this material were flexible waxy threads with a glossy finish and had a tensile strength above 43,000 pounds per square inch.

Example 2

A composition was prepared as in Example 1 but substituting Amberol M-82, a modified phenol-aldehyde resin having a melting point of 131° to 132° C., for the Arochem 510. The solvent medium employed was benzene. The composition could easily be molded or extruded and filaments prepared from this material were tough durable glossy threads with a waxy handle and had a tensile strength above 46,000 pounds per square inch.

Example 3

A composition was prepared as in Example 1 but substituting Bakelite BR-302, an oil modified plastic phenol-aldehyde resin, for the Arochem 510. The composition could easily be molded or extruded and filaments, having a diameter of 0.016 inch, prepared from this material were flexible tough threads and had a tensile strength above 36,000 pounds per square inch.

Example 4

A composition was prepared as in Example 1 but substituting Phenac 605-N, an ester gum-modified phenol-aldehyde resin having a melting point of 119° to 121° C., for the Arochem 510. The composition could easily be molded or extruded and filaments, having a diameter of 0.012 inch, prepared from this material were flexible threads with a waxy handle and had a tensile strength above 41,000 pounds per square inch.

Example 5

A composition was prepared as in Example 1 but substituting Paranol 1600, a maleic resin-modified phenol-aldehyde resin having a melting point of 102° to 110° C., for the Arochem 510. The composition could easily be molded or extruded and filaments, having a diameter of 0.015 inch, prepared from this material were flexible glossy threads and had a tensile strength above 41,000 pounds per square inch.

Example 6

2.5 grams of Paranol 200, a maleic resin-modified phenol-aldehyde resin having a melting point of 165° to 176° C., and 5.0 grams of tributyl aconitate, to serve as a heat stabilizer, were incorporated with 20 ml. of acetone. To this solution was added 42.5 grams of a co-polymer consisting of 90 per cent vinylidene chloride and 10 per cent vinyl chloride. The mixture was ground until thoroughly blended, and then dried. The composition could easily be molded or extruded and filaments, having a diameter of 0.013, inch, prepared from this material were tough flexible threads and had a tensile strength above 36,000 pounds per square inch.

Example 7

2.5 grams of Lewisol 125, a modified phenol-aldehyde resin having a melting point of 104° to 106° C., and 1.0 grams of 1,2-epoxy-3-(2-phenylphenoxy) propane were incorporated with 20 ml. of acetone. To this solution was added 46.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.011 inch, prepared from this material were flexible glossy threads and had a tensile strength above 41,000 pounds per square inch.

Example 8

4.5 grams of Arochem 510, a modified phenol-aldehyde resin having a melting point of 100° to 105° C., and 0.5 grams of a co-polymer consisting of 90 per cent vinylidene chloride and 10 per cent vinyl chloride were placed in a test tube and heated to a fusion temperature. The product was a homogeneous amber colored brittle solid.

The compositions which contain relatively low proportions of the modified phenol-aldehyde resins have improved molding and extruding properties, while the compositions which contain relatively large proportions of the resins are hard brittle masses. The latter compositions may be advantageously used in preparing improved lacquers, varnishes or paints.

The following data regarding the modified phenol-aldehyde resins named in the foregoing examples are obtained from catalogs of the respective manufacturers.

| Name and manufacturer | Type | Acid number | M. P. | Color | Sp. G. | Solubility and remarks |
| --- | --- | --- | --- | --- | --- | --- |
| Arochem 510 (Stroock and Wittenberg). | Modified condensate | 18-23 | 135-145° C. | WG-WW | 1.1 | Soluble in usual solvents except alcohol. |
| Amberol M-82 (Resinous Products). | Rosin mod. hydrocarbon substituted phenolic. | 12-18 | 127-133° C. | | 1.10 | Soluble in usual solvents; oil at 400° F.; insoluble in acetone and alcohol. Viscosity, 56% toluene solution—0.7 poises. |
| Bakelite BR-302 (Bakelite). | Oil modified | 30 | | 4L-6L | 1.02 | Soluble in usual solvents. Viscosity of 25% solution in toluene—200-300 c. p. s. |
| Paranol 1600 (Paramet) | Modified | 15-18 | 245-255° F. | Extra light—WG. | 1.08 | Soluble in usual solvents except alcohol. Soluble in mineral spirits. |
| Paranol 200 (Paramet) | do | 30-40 | 285-259° F. | Light—M. | 1.09 | Soluble in coal tar solvents; slightly soluble in mineral spirits; insoluble in alcohol. |
| Lewisol 125 (Lewis) | do | 12-20 | 125-135° C. | N-WG | 1.1 | Soluble in cold hydrocarbons; insoluble in alcohol. |

The proportion of modified phenol-aldehyde resin to be employed in the new compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils, or filaments should have high flexibilty at all temperatures met with in service and be sufficiently hard and tough enough to withstand abrasion. Similarly, lacquer coatings must be hard, tough, and possess good adherence and flexibility. The exact proportion of modifying agent to be employed in preparing the new compositions will depend on the use requirements. In general, from about 0.5 to about 90 per cent of the modified phenol-aldehyde resins may be employed, based on the weight of the polymeric vinylidene chloride product with which they are incorporated. When it is desired simply to produce a product having improved molding and extruding properties and which can be worked to form useful articles, threads, bands, filaments, foils and the like which retain the high tensile strength shown by the parent polymeric vinylidene chloride product, the amount of the modified phenol-aldehyde resin will ordinarily vary from about 0.5 to about 40 per cent and more specifically from about 2 to about 7.5 per cent. When, however, it is desired to produce a polymeric vinylidene chloride product which is substantially more compatible with many of the commonly used lacquer solvents, the amount of modified phenol-aldehyde resin employed may vary from about 10 to about 90 per cent.

While the above examples show the preparation of compositions from a polymeric vinylidene chloride product consisting of a co-polymer of 90 per cent vinylidene chloride and 10 per cent vinyl chloride, incorporated with modified phenol-aldehyde resins, other polymeric vinylidene chloride products which have wide commercial value and which may be advantageously used in preparing the new compositions, include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include 1,2-epoxy-3-(2-phenyl-phenoxy) propane, allyl disulfide, 2-chloro-allyl-disulfide, 2,2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers, and the like has also been found to be useful and desirable when used in such amounts that the desirable mechanical properties of the product are not affected.

Other modes of applying the principle of our invention may be employed instead of those explained, change being made as regards the materials employed, provided the product recited in the following claims be obtained.

We therefore point out and distinctly claim as our invention:

1. A thermoplastic composition, the essential ingredients of which are (1) a polymer of vinylidene chloride wherein the vinylidene chloride constitutes at least 70 per cent of the polymer, and (2) a minor proportion relative thereto of a phenol-aldehyde resin which has been modified in the course of its preparation with one of the conventional modifying agents selected from the class consisting of natural resins and drying oils.

2. A thermoplastic composition, the essential ingredients of which are (1) a polymer of vinylidene chloride wherein the vinylidene chloride constitutes at least 70 per cent of the polymer, and (2) from about 2 to about 7.5 per cent, based on the weight of polymer, of a rosin-modified hydrocarbon-substituted phenol-formaldehyde resin.

3. A thermoplastic composition, the essential ingredients of which are (1) a copolymer of from about 5 to about 30 per cent of vinyl chloride and correspondingly from about 95 to about 70 per cent of vinylidene chloride, and (2) from about 2 to about 7.5 per cent, based on the weight of copolymer, of a rosin-modified hydrocarbon-substituted phenol-formaldehyde resin which resin melts near 130° C., has an acid number between 12 and 18, a specific gravity near 1.1 and which is soluble in oil at 400° F., but insoluble in acetone and alcohol.

EDGAR C. BRITTON.
HAROLD W. MOLL.